*L. H. Moss,*

*Tobacco Press.*

No. 112,065. Patented Feb. 21. 1871.

Witnesses:
Victor Hagmann
A. E. Rawlings.

Inventor:
Lewis H. Moss
By Hill & Ellsworth
attys.

United States Patent Office.

LEWIS H. MOSS, OF BROWNINGSVILLE, KENTUCKY.

Letters Patent No. 112,065, dated February 21, 1871.

IMPROVEMENT IN TOBACCO, HAY, AND COTTON-PRESSES.

The Schedule referred to in these Letters Patent and making part of the same.

*To all whom it may concern:*

Be it known that I, LEWIS H. MOSS, of Browningsville, in the county of Bracken and State of Kentucky, have invented certain Improvements in Tobacco, Hay, and Cotton Presses; and I declare the following to be a full, clear, and exact description thereof, reference being had to the accompanying drawing, in which—

Figure 1:
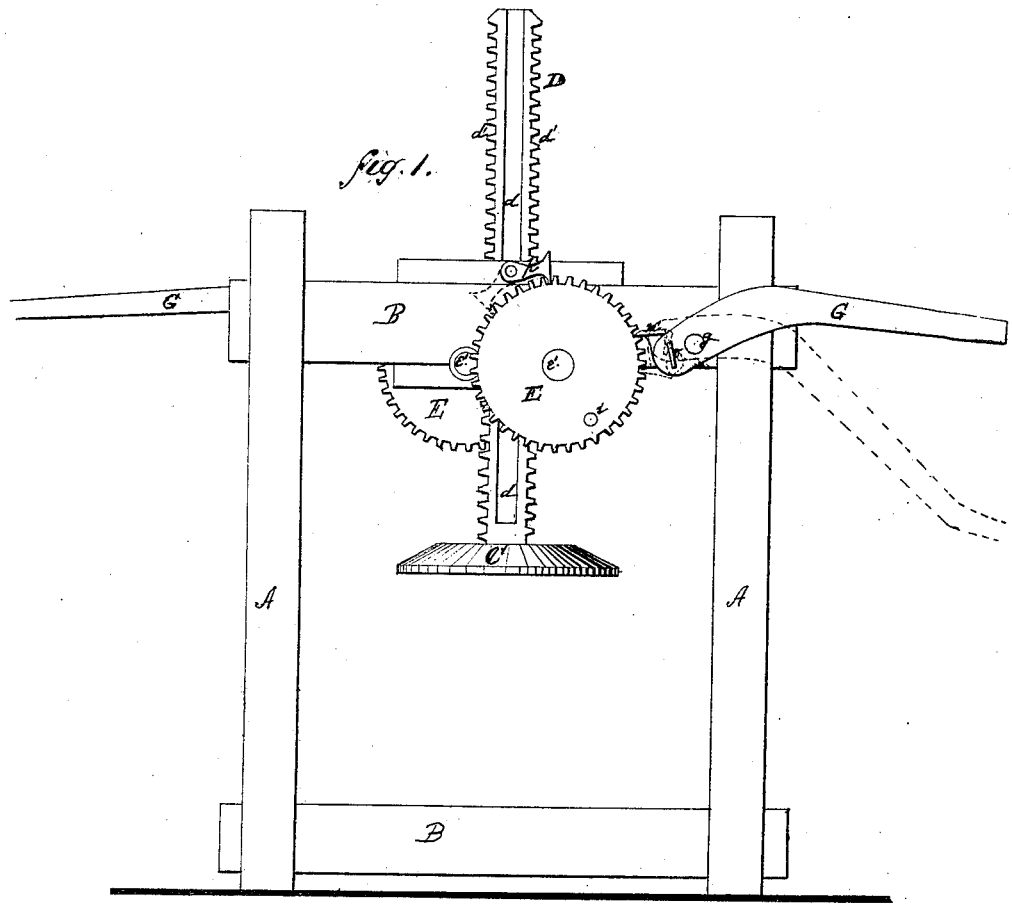
Figure 2:
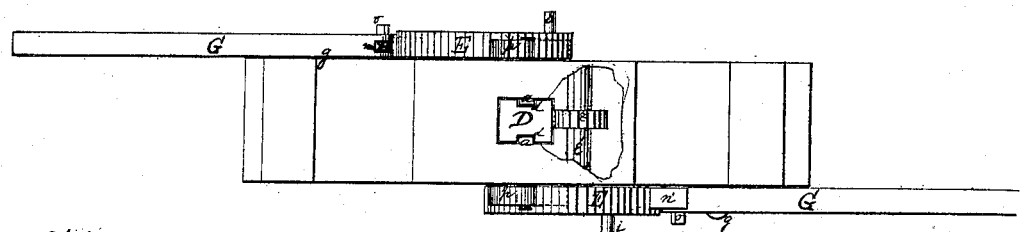

Figure 1 is a side elevation; and
Figure 2, a top view.

Similar letters of reference indicate like parts.

This invention relates to that class of presses in which the platen is attached to a vertical bar provided with lateral cogs that engage with a gear-wheel, by the rotation of which the platen is moved up and down; and My improvement consists—

First, in constructing the platen-bar so that it will work more perfectly than heretofore; and Secondly, in the employment of two levers with double-acting dogs attached to them, in connection with two large spur-wheels on the same shaft with the gear-wheels referred to, and in connection with double-acting pawls, as hereinafter described.

The object of the invention is to increase the efficiency and convenience of the press by making the levers double acting, so that they can be operated either to raise or lower the platen, as may be desired.

In the drawing—

A A are two upright posts, connected by beams, B B, these four pieces constituting the frame, and the lower cross-timber answering as the head of the press.

C is the platen, attached to an upright bar, D, grooved on two sides, as shown at *d d,* and on its other two sides provided with cog-racks, *d′ d′.*

This bar extends up through the upper cross-beam where guides, *a a,* fit into its side grooves and cause the bar to move steadily up and down in a vertical line without being forced out of position by the lateral pressure of the cog-wheels that operate it.

Said cog-wheels are designated by the letters *e e,* and are supported upon shafts, *e′ e′,* each of which carries a large spur-wheel, E, at its outer end, the two spur-wheels being arranged on opposite sides of the beam, B; and, if necessary, provided with wrist-pins, *i i,* for convenience in rapidly raising or lowering the platen without the use of the levers.

G G are the two levers, working upon fulcrum-pins, *g g,* and preferably constructed in the form shown in fig. 1.

The head of each is provided with an open vertical slot, *m,* to receive the shank of the dogs, and allow the latter to swing up or down so as to work downward in connection with the cogs above the line of the fulcrum *g,* or upward in connection with those below said line.

The dogs are constructed with a shank, *n,* which fits into the slot *m,* and is pivoted to the lever by a pin, *o.*

The latter, for convenience in reversing the position of the dog, may be provided with a flat head, and may be fixed to the shank but allowed to turn in the bearings, so that, by taking hold of the head and turning the pin, the dog can be raised or lowered at pleasure.

The shank *n* terminates in a flat head, *n′,* constructed so that one side of it will engage with the cogs of the spur-wheel, when raised above the line of the fulcrum, and the other side when dropped below it, as shown in the dotted lines.

The dog is thus double acting, operating the wheel equally as well in one direction as the other.

Care must be taken in constructing the press to adjust the fulcrum and the length and shape of the levers and dogs properly, so that the latter will readily engage with the cogs in either position.

In addition to these parts, double-acting pawls, *p p,* are placed at the opposite sides of the wheels E E, or near their upper edge, as shown, in shape and action corresponding to the dogs *n n′,* for the purpose of holding the wheels, when necessary, and of preventing at all times any improper retrograde movement on their part.

The press can be worked by a single lever and pawl, but more efficiently by using both levers, with stroke alternate when speed is preferred to power, and simultaneous, when power to speed.

Having thus described my invention,

What I claim as new, and desire to secure by Letters Patent, is—

The double-acting dogs *n n′,* in combination with the levers G G, wheels E E, shafts *e′ e′,* gear-wheels *e e,* and platen-stem D, when constructed and arranged to operate substantially as and for the purposes set forth.

LEWIS H. MOSS.

Witnesses:
 JOS. B. MCCLANAHAN,
 MICHAEL C. FORTUNE.